(12) United States Patent
Calhoon et al.

(10) Patent No.: US 8,570,586 B2
(45) Date of Patent: Oct. 29, 2013

(54) ACTIVE IMAGES THROUGH DIGITAL WATERMARKING

(75) Inventors: Sean Calhoon, Lake Oswego, OR (US); Tony F. Rodriguez, Portland, OR (US)

(73) Assignee: Digimarc Corporation, Beaverton, OR (US)

( * ) Notice: Subject to any disclaimer, the term of this patent is extended or adjusted under 35 U.S.C. 154(b) by 860 days.

(21) Appl. No.: 11/381,295

(22) Filed: May 2, 2006

(65) Prior Publication Data

US 2007/0091376 A1 Apr. 26, 2007

Related U.S. Application Data

(60) Provisional application No. 60/677,597, filed on May 2, 2005, provisional application No. 60/706,940, filed on Aug. 9, 2005, provisional application No. 60/751,951, filed on Dec. 19, 2005.

(51) Int. Cl.
*G06K 15/00* (2006.01)

(52) U.S. Cl.
USPC .................. 358/1.18; 358/3.28; 382/100

(58) Field of Classification Search
USPC .................. 358/1.18, 3.28; 382/100
See application file for complete search history.

(56) References Cited

U.S. PATENT DOCUMENTS

| | | |
|---|---|---|
| 5,499,294 A | 3/1996 | Friedman |
| 5,646,997 A | 7/1997 | Barton |
| 5,892,900 A | 4/1999 | Ginter et al. |
| 5,893,095 A | 4/1999 | Jain et al. |
| 5,940,121 A | 8/1999 | McIntyre et al. |
| 6,122,403 A * | 9/2000 | Rhoads ............... 382/233 |
| 6,148,092 A | 11/2000 | Qian |
| 6,180,312 B1 | 1/2001 | Edwards |
| 6,243,480 B1 | 6/2001 | Zhao et al. |
| 6,243,713 B1 | 6/2001 | Nelson et al. |
| 6,353,672 B1 | 3/2002 | Rhoads |
| 6,360,234 B2 | 3/2002 | Jain et al. |

(Continued)

FOREIGN PATENT DOCUMENTS

| | | |
|---|---|---|
| WO | WO9743736 | 11/1997 |
| WO | WO0150665 | 7/2001 |
| WO | WO0161508 | 8/2001 |
| WO | WO2006009663 | 1/2006 |

OTHER PUBLICATIONS

Benitez et al, Object-Based Multimedia Content Description Schemes and Applications for MPEG-7, Signal Processing—Image Communication, vol. 16, Issues 1-2, Sep. 2000, pp. 235-269.

(Continued)

*Primary Examiner* — Jacky X Zheng
(74) *Attorney, Agent, or Firm* — Digimarc Corporation

(57) ABSTRACT

The presently claimed invention relates generally to methods and apparatus employing digital watermarking. Once claim recites an apparatus including: electronic memory for storing received digital imagery or audio, in which the digital imagery or audio comprises digital watermarking including a first instruction, in which the digital watermarking is hidden in the digital imagery or audio through alterations of data representing the digital imagery or through alterations of data representing the audio; and an electronic processor programmed for: decoding the digital watermark from the digital imagery or audio to obtain a first instruction; and based at least in part on the obtained first instruction, updating said apparatus when an address associated with the digital imagery or audio changes. Of course, other claims and combinations are provided too.

16 Claims, 9 Drawing Sheets

(56) References Cited

U.S. PATENT DOCUMENTS

| | | |
|---|---|---|
| 6,389,181 B2 | 5/2002 | Shaffer et al. |
| 6,411,724 B1 | 6/2002 | Vaithilingam et al. |
| 6,442,285 B2 | 8/2002 | Rhoads et al. |
| 6,449,377 B1* | 9/2002 | Rhoads .................. 382/100 |
| 6,490,370 B1 | 12/2002 | Krasinski et al. |
| 6,505,160 B1 | 1/2003 | Levy et al. |
| 6,519,352 B2 | 2/2003 | Rhoads |
| 6,522,769 B1 | 2/2003 | Rhoads et al. |
| 6,549,922 B1 | 4/2003 | Srivastava et al. |
| 6,606,398 B2 | 8/2003 | Cooper |
| 6,629,104 B1 | 9/2003 | Parulski et al. |
| 6,694,042 B2 | 2/2004 | Seder et al. |
| 6,738,100 B2 | 5/2004 | Hampapur et al. |
| 6,754,822 B1 | 6/2004 | Zhao |
| 6,813,618 B1 | 11/2004 | Loui et al. |
| 6,829,368 B2 | 12/2004 | Meyer et al. |
| 6,833,865 B1 | 12/2004 | Fuller et al. |
| 6,877,134 B1 | 4/2005 | Fuller et al. |
| 6,931,147 B2 | 8/2005 | Colmenarez et al. |
| 6,965,873 B1 | 11/2005 | Rhoads |
| 6,972,856 B1 | 12/2005 | Takahashi |
| 6,980,668 B1* | 12/2005 | Naito et al. .................. 382/100 |
| 7,003,731 B1* | 2/2006 | Rhoads et al. ................ 715/768 |
| 7,003,871 B2 | 2/2006 | Rhoads et al. |
| 7,010,144 B1 | 3/2006 | Davis et al. |
| 7,054,508 B2 | 5/2006 | Hanamoto |
| 7,068,309 B2 | 6/2006 | Toyama et al. |
| 7,084,903 B2 | 8/2006 | Narayanaswami et al. |
| 7,095,871 B2 | 8/2006 | Jones et al. |
| 7,171,018 B2 | 1/2007 | Rhoads et al. |
| 7,171,113 B2 | 1/2007 | Parulski et al. |
| 7,209,571 B2 | 4/2007 | Davis |
| 7,222,163 B1 | 5/2007 | Girouard et al. |
| 7,233,684 B2 | 6/2007 | Fedorovskaya et al. |
| 7,234,106 B2 | 6/2007 | Simske |
| 7,251,475 B2 | 7/2007 | Kawamoto |
| 7,266,704 B2 | 9/2007 | Levy |
| 7,272,788 B2 | 9/2007 | Anderson et al. |
| 7,295,213 B2 | 11/2007 | Kim et al. |
| 7,328,411 B2 | 2/2008 | Satanek |
| 7,349,552 B2 | 3/2008 | Levy et al. |
| 7,372,976 B2 | 5/2008 | Rhoads et al. |
| 7,403,299 B2 | 7/2008 | Takahashi |
| 7,412,072 B2 | 8/2008 | Sharma et al. |
| 7,450,734 B2 | 11/2008 | Rodriguez et al. |
| 2002/0120849 A1* | 8/2002 | McKinley et al. ............ 713/176 |
| 2002/0120925 A1 | 8/2002 | Logan |
| 2002/0124050 A1 | 9/2002 | Middeljans |
| 2002/0154144 A1* | 10/2002 | Lofgren et al. ............... 345/634 |
| 2002/0188841 A1* | 12/2002 | Jones et al. ................... 713/153 |
| 2002/0194480 A1* | 12/2002 | Nagao ........................... 713/176 |
| 2003/0154178 A1 | 8/2003 | McIntyre et al. |
| 2003/0187798 A1 | 10/2003 | McKinley et al. |
| 2004/0100652 A1* | 5/2004 | Cooper ........................ 358/1.15 |
| 2004/0213553 A1 | 10/2004 | Nagahashi |
| 2005/0088684 A1* | 4/2005 | Naito et al. .................. 358/1.15 |
| 2005/0213553 A1 | 9/2005 | Wang |
| 2006/0018506 A1* | 1/2006 | Rodriguez et al. ............ 382/100 |
| 2006/0115108 A1* | 6/2006 | Rodriguez et al. ............ 382/100 |
| 2007/0055689 A1 | 3/2007 | Rhoads |
| 2007/0248241 A1 | 10/2007 | Nagao |
| 2007/0266252 A1 | 11/2007 | Davis et al. |
| 2008/0028223 A1 | 1/2008 | Rhoads et al. |
| 2008/0049971 A1 | 2/2008 | Ramos et al. |
| 2008/0133555 A1* | 6/2008 | Rhoads et al. ................ 707/100 |

OTHER PUBLICATIONS

Chang et al, Multimedia Search and Retrieval, a chapter in Advances in Multimedia—Systems, Standards, and Networks, Puried., New York-Marcel Dekker, 1999, 28 pp.

"Coding of Still Pictures," ISO/IEC/JTC 1/SC 29/WG 1 (ITU-SG8), Digital Imaging Group, 9 pages.

Convera Case Studies—National Basketball Association, 2001.

Friedman, "The Trustworthy Digital Camera: Restoring Credibility to the Photographic Image." IEEE Transactions on Consumer Electronics, vol. 39, No. 4, Nov. 1993, pp. 905-910.

Huang et al, Multimedia Search and Retrieval—new Concepts, System Implementation, and Application, IEEE Trans on Circuits and Systems for Video Tech, vol. 10 No. 5, Aug. 2000, pp. 679-692.

International Search Report, and Written Opinion of the International Searching Authority, each from assignee's PCT/US05/20790 (published as WO2006/009663).

Dec. 10, 2009 Amendment; Jul. 10, 2009 non-final Office Action; May 6, 2009 Amendment; Dec. 11, 2008 final Office Action; Sep. 22, 2009 Amendment; Jun. 2008 non-final Office Action, and Feb. 28, 2008 Amendment and Election, each from U.S. Appl. No. 11/152,685 (published as US 2006-0115108 A1).

Kang et al, Multimedia database system with embedding MPEG-7 meta data, Proc SPIE, vol. 4311, 2001, pp. 187-197.

Langelaar, Watermarking Digital image and Video Data, IEEE Signal Processing Magazine, Sep. 2000, pp. 20-46.

Marques, Content-Based Visual Information Retrieval, Ch 3 in Distributed Multimedia Databases, 2003, 22 pp.

Nack. Everything You Wanted to Know About MPEG-7—Part 2, IEEE Multimedia. vol. 6, No. 4, pp. 64-73. Oct. 1999, 10 pp.

Okon, "Keeping Up Multimedia Asset Value," Advanced Imaging, Jul. 1997, pp. 42-43.

Rehm, Representing Internet Streaming Media Metadata using MPEG-7 Multimedia Description Schemes, Proceedings of the 2000 ACM workshops on Multimedia, 2000, 6 pages.

Sikora. The MPEG-7 Visual Standard for Content Description—An Overview, IEEE Transactions on Circuits and Systems for Video Technology, vol. 11, No. 6, Jun. 2001, pp. 696-702.

Toyokawa. et al., "Secure Digital Photograph Handling with Watermarking Technique in Insurance Claim Process," Security and Watermarking of Multimedia Contents 11, Proc. of SPIE, vol. 3971 (2000), pp. 438-445.

"The Platform for the Future of Digital Imaging," Digital Technical Overview, Flashpoint Technology, Inc, downloaded Jan. 1, 2000, 5 pages.

"The Power of Metadata is Propelling Digital Imaging Beyond the Limitations of Conventional Photography," The Digital Imaging Groups's DIG35 Initiative, Aug. 1999, 7 pages.

Villegas et al, An Environment for Efficient Handling of Digital Assets, Proc. of Workshop on Image Analysis for Multimedia Interactive Services, WIAMIS 2003, Apr. 2003, London, 8 pp.

Wingfield, "FlashPoint Helps Beam Photos Onto the Web," Wall Street Journal, Dec. 23, 1999, 1 page.

Zhao, "A WWW Service to Embed and Prove Digital Copyright Watermarks," In Proc. of the European Conf. on Multimedia Applications, Services and Techniques, Louvain-La-Neuve, Belgium, May 1996, 14 pages.

* cited by examiner

ACTIVE IMAGES THROUGH DIGITAL WATERMARKING

RELATED APPLICATION DATA

The present application claims the benefit of U.S. Provisional Patent Application No. 60/677,597, filed May 2, 2005; 60/706,940, filed Aug. 9, 2005; and 60/751,951, filed Dec. 19, 2005. Each of these patent applications is hereby incorporated by reference.

FIELD OF THE INVENTION

The present invention relates to image, audio and video (and other media management), and to actions facilitated through digital watermarking image and other media. The present invention also relates to security documents including, e.g., photo-identification documents, passports and financial instruments such as checks, banknotes, etc.

SUMMARY OF THE INVENTION

As detailed in the assignee's prior patent documents, including, e.g., U.S. Pat. Nos. 6,947,571 and 6,965,682, digital watermarking technology has numerous applications beyond its traditional role of simply communicating copyright information. Each of these patents is hereby incorporated by reference. One futuristic view foresees that all "content" should be watermarked, thereby enabling a great variety of operations and transactions whenever watermarked content is processed by digital devices equipped with watermark recognition and reading technology. All physical media objects can thereby be inherently and persistently digitally-enabled, permitting greatly simplified access to networks and execution of local and remote applications.

The present invention provides active images through digital watermarking. The term "active images" covers a broad range of images, both physical and electronic. A common thread binding active images is digital watermarking (or other steganographic indicia). Digital watermarking activates an otherwise ordinary image, enabling a wide range of possibilities.

Digital watermarking is a process for modifying physical or electronic media to embed a generally imperceptible, machine-readable code into the media. The media may be modified such that the embedded code is imperceptible or nearly imperceptible to the user, yet may be detected through an automated detection process. We sometimes use the terms "media" and "content" interchangeably. (We also use the terms "photo" and "image" interchangeably.)

Digital watermarking systems typically have two primary components: an encoder that embeds the digital watermark in a host media signal, and a decoder that detects and reads the embedded digital watermark from a signal suspected of containing a digital watermark (a suspect signal). The encoder embeds a digital watermark by altering the host media signal. The alterations usually take the form of altered signal values, such as slightly changed pixel values, luminance, colors, changed DCT coefficients, altered signal values or selective placement or signal tweaks, etc. However, a watermark can also be manifested in other ways, such as changes in the surface microtopology of a medium, localized chemical changes (e.g. in photographic emulsions), localized variations in optical density, localized changes in luminescence or chrominance, etc. The surface texture of an object may be altered to create a watermark pattern. This may be accomplished by manufacturing an object in a manner that creates a textured surface or by applying material to the surface (e.g., an invisible film or ink) in a subsequent process. The watermark detecting component analyzes content to detect whether a watermark pattern is present. In applications where the watermark encodes information, the reading component extracts or decodes this information from the detected watermark. The reading component can be hosted on a wide variety of units ranging from tethered or wireless reader devices, conventional personal computers, network servers, printers, scanners, cell phones including cameras, to fully mobile readers with built-in displays. Image data corresponding to watermarked media is read and decoded by a watermark reader to obtain a watermark's information or "payload."

Several particular digital watermarking techniques have been developed. The reader is presumed to be familiar with the literature in this field. Some techniques for embedding and detecting imperceptible watermarks in media signals are detailed in assignee's U.S. Pat. Nos. 6,614,914 and 6,122,403, PCT patent application PCT/US02/20832 (published in English as WO 03/005291) and assignee's U.S. patent application Ser. No. 11/153,901, filed Jun. 14, 2005 (published as U.S. 2006-0008112 A1). Each of the above patent documents is hereby incorporated by reference.

Additional features, advantages and aspects of the present invention are even further described below with respect to the following figures.

DETAILED DESCRIPTION

Printers have emerged with "all-in-one" capabilities. These printers have printing, scanning and even fax/email capabilities. Examples include HP's Photosmart 2410 or 2710 all-in-one, which offer photo features allowing users to view, print and edit photos without a computer using memory cards and a color image display or by using a photo "proof sheet" feature. HP provides other printers with all-in-one functionality, as do, e.g., Canon and Lexmark.

Figure 1:
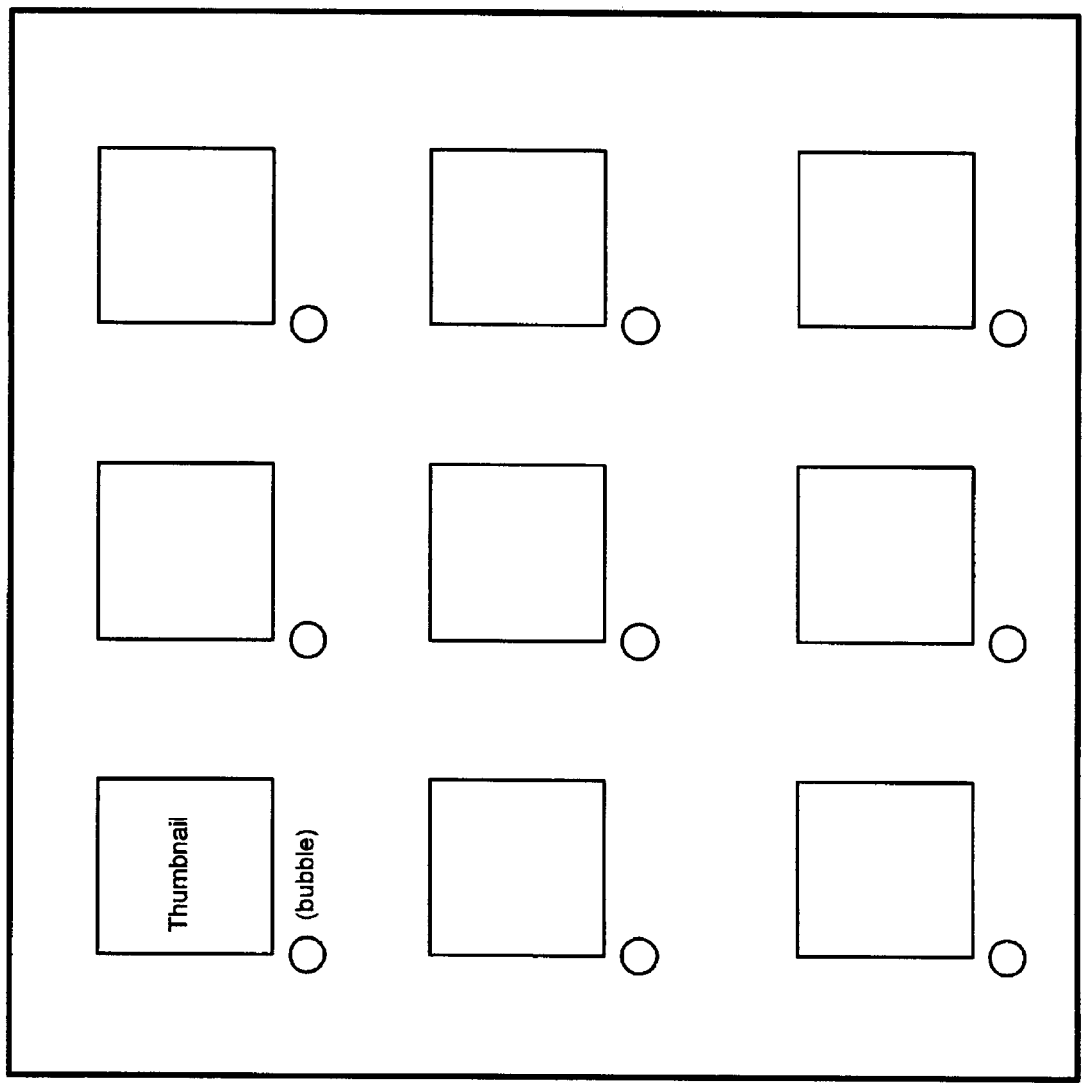
FIG. 1 illustrates a printed photo sheet (or contact sheet), including a representation or thumbnail for a plurality of images.
Figure 2:
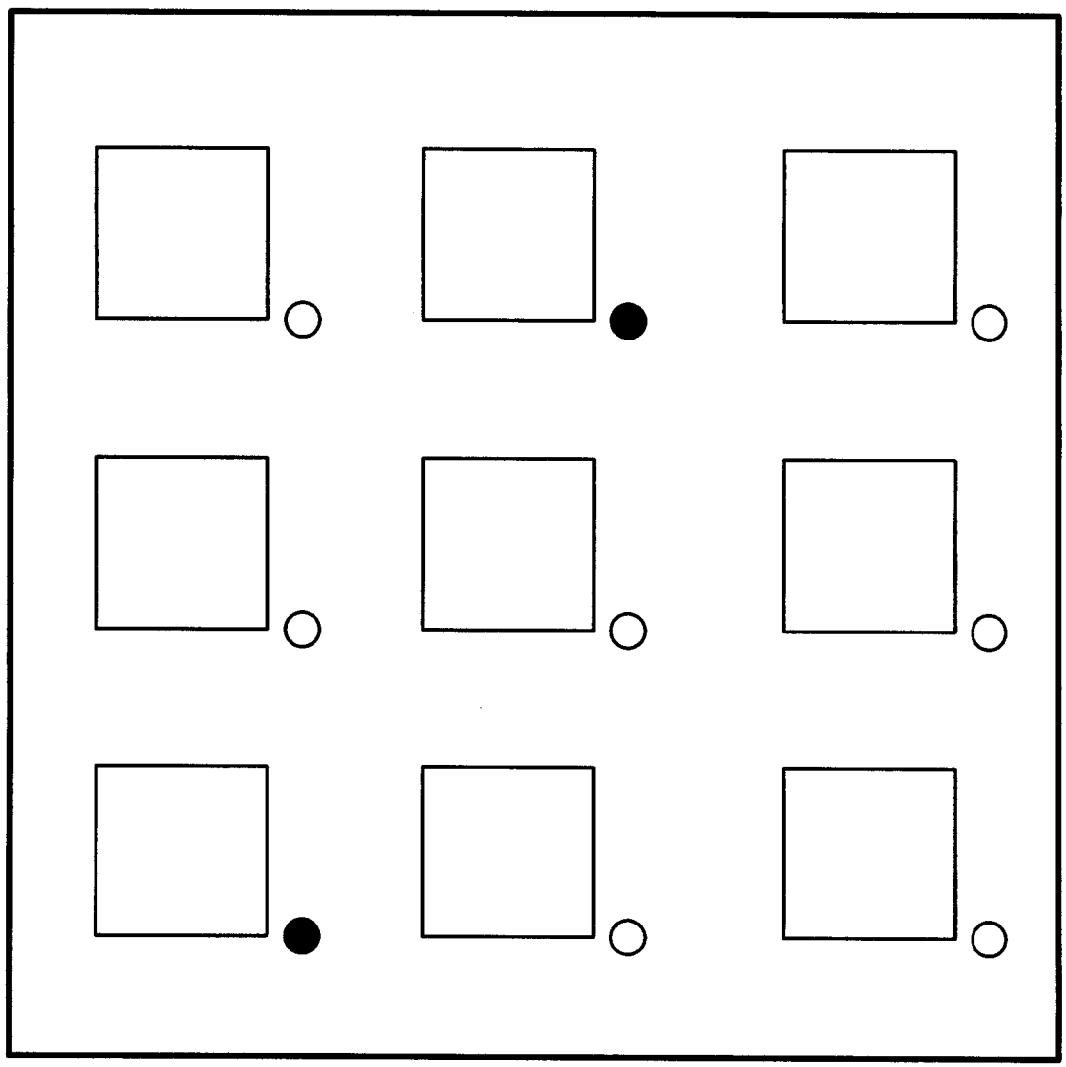
FIG. 2 illustrates a photo sheet including several marked (or bubbled) thumbnails.

A photo proof sheet (or contact sheet) typically includes a printed sheet including some or all of the photos stored on a memory card. (The printer may include a card reader, eliminating interaction with a networked computer. Sometimes a printer will print one or more proof sheets upon insertion of a memory card or when prompted by a user through a cooperating printing application and graphical user interface.). A proof sheet includes reduced fidelity images (or image "thumbnails") printed thereon (FIG. 1). The proof sheet also allows a user to "check a box" (or bubble-in) which photos she wants to print and often specify a particular size, print quality and quantity for printing. A bubbled-in proof sheet (FIG. 2) is scanned back into the all-in-one printer and digital images corresponding to any marked pictures are retrieved from the memory card and printed by the printer.

But what happens when the photos are removed from the memory card, or if the memory card is removed from the printer? How does the proof sheet and printer know where to find the photos? Or, heaven forbid, what happens if a photo is printed and then soiled? How does one find another copy?

We provide solutions through digital watermarking.

Prior to printing a proof sheet, digital images are digital watermarked. While a printer may include a digital watermark embedder to watermark images, digital watermarking can be accomplished in a digital camera or on a cooperating personal computer. If watermarking occurs on a digital camera, images can be watermarked prior to or when transferred to a printer. If watermarking occurs on a networked (including wireless networks) computer, images can be watermarked by the computer and transferred to the printer for printing. The printer can even transfer pictures on a memory card to an image repository or directory, e.g., on a networked computer or online storage location. Watermarking transferred images can occur (e.g., as an automated process) once the images are received at the image repository. (In some implementations the act of transferring or storing an image in a particular data location triggers watermarking of the images.).

If the printer includes a watermark embedder, images stored on a memory card can be watermarked prior to printing a proof sheet. The watermark survives the printing process.

A user prints a proof sheet. Each image thumbnail on the printed proof sheet includes one or more digital watermarks. A watermark carries an identifier. The identifier is used to identify a corresponding image and can be mapped to or otherwise associated with a storage location at which the image can be found.

The user marks or bubbles in which images she wants to print and scans-in the bubbled-in proof sheet in via the all-in-one printer.

A controller (e.g., printer software, hardware, and/or DPS circuitry, etc.) recognizes which images are selected (or bubbled in) on the proof sheet. A digital watermark decoder analyzes optical scan data corresponding to the selected (or bubbled in) images. The decoder reads a watermark to obtain an image watermark identifier. Instead of using the scanned-in image as a master to print additional copies, we can obtain an original digital image version for printing. The image watermark identifier can be used to locate the original digital image, e.g., as an index into an image database or memory location. An image database may include the image or information to identify a current location of the image.

Image address information from the database is used to identify a current location of an original image. The original image is retrieved and rendered for printing.

This functionality is rather straightforward when the image storage location is on a memory card, e.g., taken from a digital camera and inserted into a printer.

Finding a digital image becomes harder, however, when the digital image is moved to an alternative storage location such as a PC or on-line storage site.

A digression is warranted to discuss a watermark payload structure and image managing methods. The term "payload" is used to describe information carried by a watermark. This information usually includes multi-bits (e.g., 54-256 bits).

A watermark payload may include a segmented address space. A first segment may include source information and a second segment may include an image identifier as shown in Table 1.

TABLE 1

Watermark Payload (Example 1)

| Source Information | Image Identifier |
|---|---|

Additional segments can be used for commands (e.g., instructions on how to handle or forward, usage rights associated with an image, image fingerprint, etc.) as shown in Table 2.

TABLE 2

Watermark Payload (Example 2)

| Source Information | Image Identifier | Commands |
|---|---|---|

Source information can take a variety of forms. In one implementation source information includes a database identifier or file name/location. In another implementation source information includes a link (or address or IP address, etc) to an online photo gallery, e.g., where a user uploads her photos. Instead of a direct link, the source information may include a link or pointer to an intermediate database, from which a destination address is obtained. In still further implementations source information identifies a user domain, either a home network domain or an on-line domain.

An image identifier can be used to uniquely identify an image, identify a family of images or image source, etc.

A database structure or, in more simple implementations, a lookup table, can be used to manage current locations of images. If a storage location of an image moves, the database can be updated to reflect the change.

A watermarking payload space can be further segmented. Fingerprinting, facial recognition and image pattern recognition can be used to identify an image. This frees up additional watermark payload space for database or online addressing. Once derived from content, such fingerprinting, facial recognition, etc., can be forwarded to a database along with a decoded watermark payload.

An image search engine (e.g., think desktop searching as discussed in assignee's U.S. patent application Ser. No. 11/152,685, filed Jun. 13, 2005, which is hereby incorporated by reference) can be utilized to track and maintain current image locations. The image search engine combs drives, directories and even online resources, if so instructed, searching for images. Upon encountering an image, the search engine notes the storage address or file location, decodes a digital watermark and updates the database structure, lookup table or search engine index. The search engine can operate as a background or scheduled process.

Returning to our all-in-printer implementation, we left our user as she had just scanned in a bubbled-in proof sheet. Watermark detection occurs and a payload is obtained. If using a segmented address space, e.g., as discussed above, the watermark includes at least source information and an image identifier. A controller facilitates communication to obtain a copy of the image (as identified by the image identifier) at the address location (as identified by the source information). If not using a segmented address space, the watermark still may include sufficient information to allow image retrieval. The information may include a database index, which the controller defaults to. The index is provided to the database to identify the image stored therein.

The image is printed once obtained.

The user is so happy with her printed image that she takes it to her brother's house in Boring, Oreg., to show off her work (for example). She packs along her proof sheet as well. Her brother likes the printed image, but also wants two other images shown on the proof sheet, for a total of three images. The brother bubbles-in the two other images on the proof sheet and scans-in the print sheet on his all-in-one printer (or other optical scanner). A digital watermark decoder decodes the digital watermarks from the three images. A compliant controller at the brother house (e.g., hosted on a printer or computer) uses the watermark payload to locate the images.

Two approaches are illustrative of our inventive methods and system. In a first approach, the user has transferred the image to an on-line image repository, e.g., as provided by Fickr.com or SnapFish.com. The transfer can be initiated by the user's printer, e.g., upon sensing images in a memory card, or routed from a cell phone, computer, portable music player or digital camera, etc. The watermark includes source information to allow the brother's printer to identify the storage location (e.g., SnapFish.com). The watermark may also include an image identifier so that once communicating with the image repository, the desired image can be obtained and provided to the brother's printer.

A second approach is akin to a peer-to-peer file sharing system. The user has stored her images on her home computer (or cell phone). The watermark again includes source information, e.g., IP address or cell phone number, and image identifier. The brother's printer (or attached computer) negotiates communication with the user's computer or cell phone to obtain the images.

A further, related improvement tracks where watermarked content is communicated and stored. Suppose, for example, that a user emails a watermarked image to her uncle in Tanzania. A watermark decoder analyzes the image once it is attached to the email or when the email is sent. If a watermark is found, the watermark identifier and email address are stored in a database structure or added to a desktop search index. Then, when a user wishes to find a particular image, the email trail is presented as a possible source of the image. (Similarly, email residue in a "sent folder" of an email editor can be listed as a possible source for the image.).

In another example, the user uploads the image to an online image repository and then erases the image from her hard drive. Luckily, the user has a content tracker on her computer—possibly integrated with or plugged into a desktop searching tool. The content tracker is triggered by the act of uploading the image. The tracker searches the image to determine whether it is watermarked. A watermark, if found, and the target uploading address are added to the search engine or content tracker index. That way, when the user presents a hard copy of the image to an optical sensor (e.g., all-in-one printer, digital camera, cell phone, etc.) which obtains a watermark identifier there from, the content tracker can find the last known location of the original image (e.g., online storage site) via the watermark identifier.

The content tracker can periodically query the online site to ensure that the image is still located there and update the index accordingly. The watermark can also include a payload segment that instructs the online site to inform the user's searching tool when the image changes locations to ensure that the user has a persistent—and up to date—link to the online image. (The watermark may include or link to user information to help facilitate this update.)

In a related implementation, a cell phone (or other handheld device) is used to facilitate sending or printing an image. A cell phone includes an optical sensor, which captures optical scan data of a watermarked image. The watermark may include a segmented address space. Optical scan data is read by a digital watermark decoder to obtain the watermark. The watermark payload includes address information therein including source or location. For example, a first portion of the watermark payload may identify a source (e.g., online photo producer "SnapFish"). A second portion of the watermark payload is used to identify one or more SnapFish databases, while a third portion of the watermark payload uniquely identifies the image within a database. The watermark may even include an authorization for SnapFish to print the image and mail it back to the user. (The watermark may include a user identifier, which once registered, can be used to obtain address information.).

A graphical user interface allows a user of the cell phone to choose from one of many possible options. The image can be sent to Grandma in Wisconsin. (Behind the scenes, the user has entered Grandma's email address or user identifier. If the user entered Grandmas' user identifier, a data registry can be referenced to obtain Grandmas' routing information. Selecting the "Grandma option" sends a message to Grandma or a message to Grandma's printer. The message includes the image watermark information, which leads a program at Grandmas to go fetch the original image. In a related implementation the image identifier, grandma's user identifier and instructions are sent to an image storage location or routing controller, which per the instructions, automatically sends the image to grandma's computer or printer.). Or the image can be sent to a printer nearest to the cell phone. Behind the scenes, the cell phone may include a GPS device, which relays the cell phone coordinates along with the watermark identifier. The image is found via the identifier and is transferred to a printer nearest to the user. In other implementations the cell phone communicates directly with a nearby printer, e.g., via BlueTooth or other wireless communication.).

The beauty of this system is that Grandma can print the picture, which will include the watermark embedded therein. Years pass and the digital copy is long since deleted. Grandma stumbles upon her printed picture, which has become torn. Grandma merely presents the picture to an optical scanner. A digital watermark decoder decodes the watermark from the optical scan data to obtain the segmented payload. The various address portions are used to identify the source and location of the image.

Another option is to automatically notify people on a buddy list that a new image is available. Behind the scenes, a user pre-selects buddies for her buddy list. The cell phone decodes a watermark from a captured image and forwards the identifier to an online website (e.g., a personal account at Flickr.com). The online website uses the identifier to track down the original image. The original image is linked or added to the online website. An email is sent to each member of the buddy list, announcing the arrival of a new image, and encouraging them to visit the newly posted image. The cell phone user can set up permissions at the online website to allow certain people to view, copy or otherwise access the image.

Instead of a buddy list, a cell phone user can grant a particular individual (e.g., her brother) access the image. The brother's identifier can be appended to the watermark identifier. The online website parses the watermark identifier to: i) identify the image, and ii) identify the individual. Permissions are established to allow access to the image by the brother via his identifier. (The identifier can be verified through a password-like entry. The brother enters his password or identifier, and if it corresponds with the appended identifier for a particular account or image, access is granted.). In a related implementation, a digital watermark includes a protocol akin to a condensed version of XML language schema representing digital rights management (DRM). Usage rights are thus carried by the image as embedded in the digital watermark.

Some photo paper now comes with a tab which is removable (via paper perforations) after a photo is printed. An improvement is to print a thumbnail version of an attached image on the tab along with a digital watermark. The digital watermark can be embedded in the thumbnail or as a background tint or pattern. The digital watermark includes a segmented address space that allows a user to link back to an original (and higher fidelity version) image. That way when the tab is saved or passed along, the tab serves as a link back to the image.

Sometimes the tab is not removable, but is rather foldable. A user removes an adhesive from a back side of the tab and folds and secures the tab to a back of the image. This results in a printed image including unique machine readable features on a back side.

Now imagine an online photo album. A watermark is embedded in each image of an album. The watermark links the image to the album and to related metadata (date/time, comments, event, etc.). An image from one album is cut and pasted, e.g., onto a family webpage. The watermark maintains the link to the original source and metadata.

Additional implementations are now discussed with reference to FIGS. 3-5.

Figure 3:
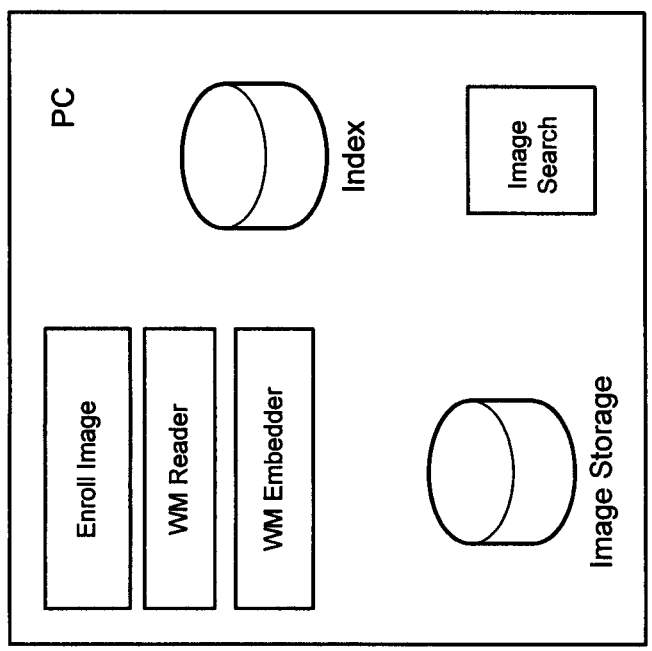
FIG. 3 illustrates a block diagram of personal computer (PC).

FIG. 3 is a block diagram showing some components of a personal computer (PC). Of course the PC may also include conventional components (e.g., processor, system communication bus, memory, communication ports, etc.) that are not shown. The PC includes an "Enroll Image" module (e.g., controller or software module(s)) to help manage images. The Enroll Image module can also be programmed to control or cooperate with functions such as watermarking, image storage, image searching, and ID management. The PC includes a digital watermark embedder and digital watermark reader to facilitate embedding and reading digital watermarks. The PC further includes or communicates with image storage, an image searching tool and a related index. The image storage may be maintained locally or at a remote, online image repository (e.g., SnapFish).

Figure 4:
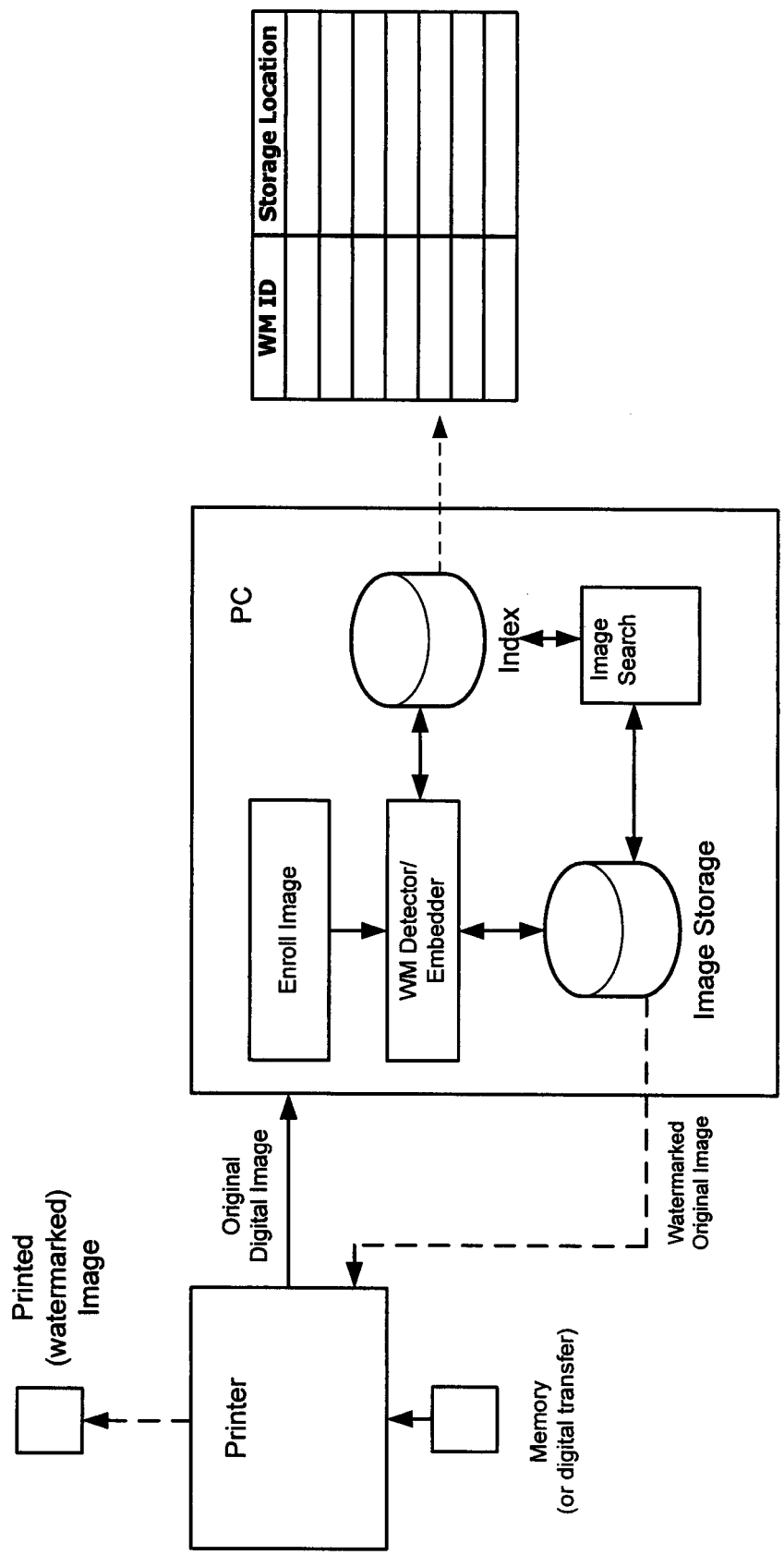
FIG. 4 illustrates a block diagram with component interaction for receiving images.

With reference to FIG. 4, a memory card (or cell phone, digital camera, etc.) communicates with a printer. Digital images from a memory card are transferred to from the printer to the FIG. 3 PC in a conventional manner (e.g., BlueTooth, WIFI, USB2, or cable, etc.). The Image Enroll module controls receipt of the digital images and prompts the digital watermark embedder to embed a digital watermark in a received digital image. An embedded digital watermark may include a plural-bit identifier (ID). The plural-bit identifier identifies at least the image. The watermarked digital image is stored (now sometimes referred to as an "original digital image" or "watermarked original image") and the watermark ID and image storage location are logged in the index. Instead of the Enroll Image module logging the watermark ID and image storage location in the index, an Image Search tool can process the watermarked image, e.g., as discussed in assignee's U.S. patent application Ser. No. 11/152,685. A watermarked original image is returned from the PC to the printer for printing. In case of printing a contact sheet, each image representation or thumbnail maybe watermarked.

Figure 5:
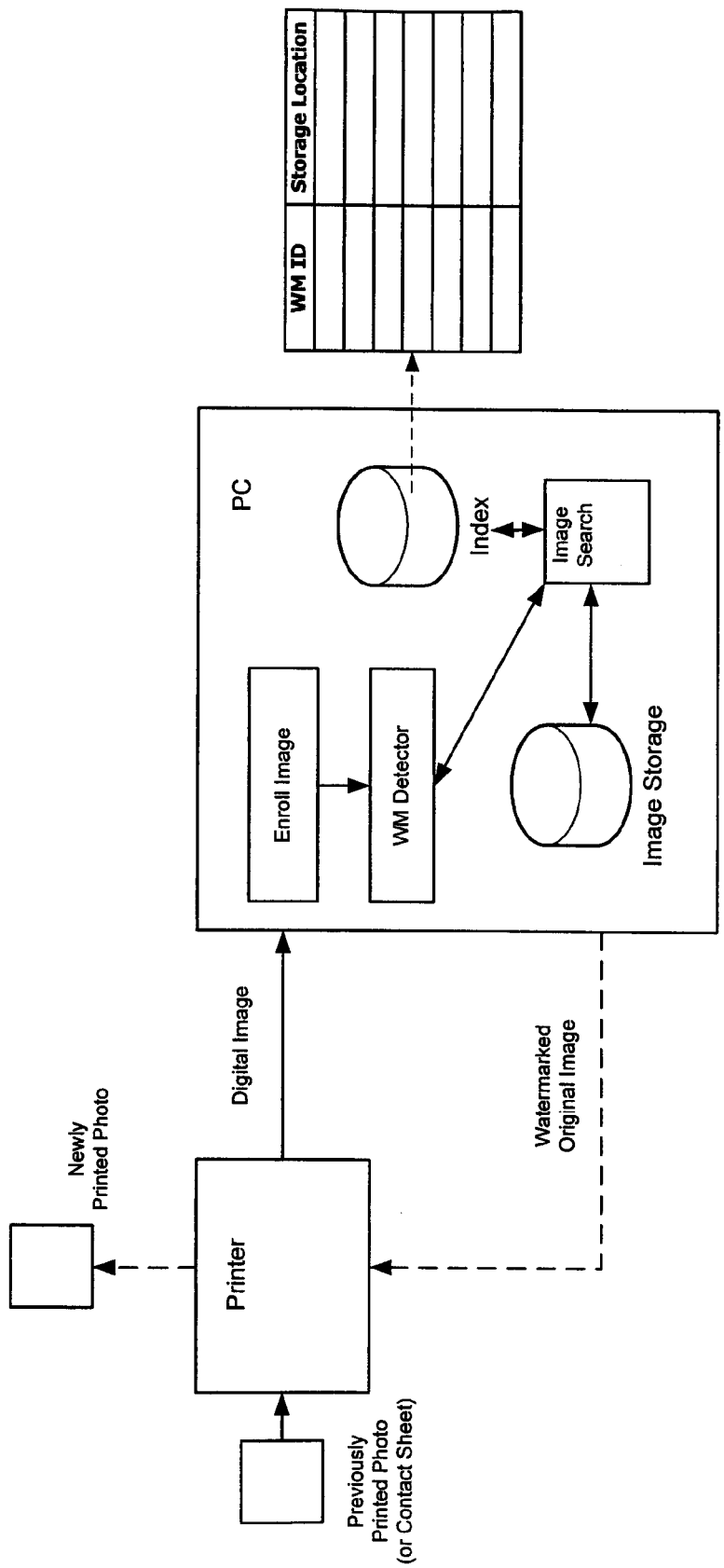
FIG. 5 illustrates a block diagram with component interaction for printing an image that is related to a scanned image.

FIG. 5 illustrates image retrieval. A previously printed image is presented to an all in one printer. The printed image includes a digital watermark embedded therein. (Instead of a "printed photo," a cell phone or other digital camera may capture a picture of a printed image and transfer a digital version of the captured, watermarked image to the printer.) The printer scans the printed image to yield a digital image. The digital image is communicated to the PC. The Enroll Image module receives the digital image and prompts a digital watermark detector to analyze the digital image in search of a watermark ID. Once obtained, a watermark ID is provided to the image searching tool (or directly to an index generated by the image searching tool) to locate an original image or storage location associated with the watermark ID. A watermarked original image, once found, is provided to the printer for printing.

Implementations involving both fingerprinting and digital watermarking are discussed with reference to FIGS. 6-7. (For our purposes here, "fingerprinting" is defined broadly to include a reduced-bit representation of content. Other interchangeable terms include "signature" and "hash" among others.)

There may be some instances where an original image need not be watermarked. (Some image "purists" resist watermarking their original images despite recent watermarking trends toward ultra-imperceptibility.). There may also be some situations where efficiencies are achieved through combining digital watermarking and fingerprinting.

As a general overview, we provide a digital watermark for content identification in a "physical" domain (e.g., printed image, broadcast audio or video, etc.) and use fingerprinting for content identification in a digital domain (e.g., digital image, audio or video).

Figure 6:
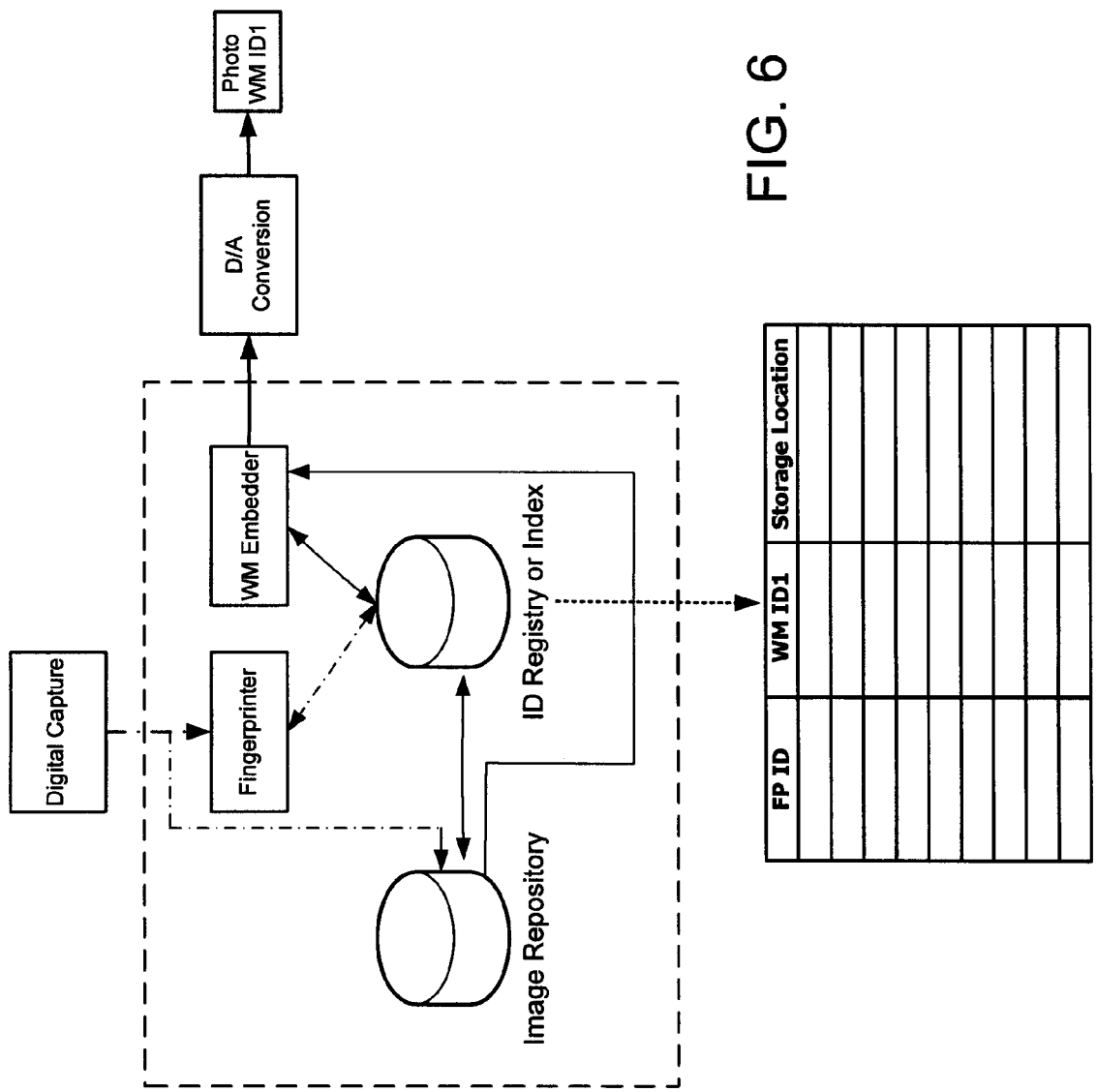
FIG. 6 illustrates a system utilizing fingerprinting in a digital domain and digital watermarking in a physical domain.

With reference to FIG. 6, an image is digitally captured, e.g., with a digital camera, optical sensor, cell phone or image software, etc. resulting in a digital image. The dashed lines in FIG. 6 represent a digital domain. The digital image is fingerprinted. That is, fingerprinting software (or hardware) analyzes the digital image and produces a reduced-bit representation of the digital image. The representation is used to identify the digital image. A resulting image fingerprint is stored in a registry or index, along with an image storage location or file name. The digital image is stored in an image repository.

The digital image is watermarked prior to or during transition to the physical domain (e.g., prior to printing). The digital watermark includes a watermark ID (e.g., WM ID1). The watermark ID is associated with the fingerprint ID in the registry or index.

Figure 7:
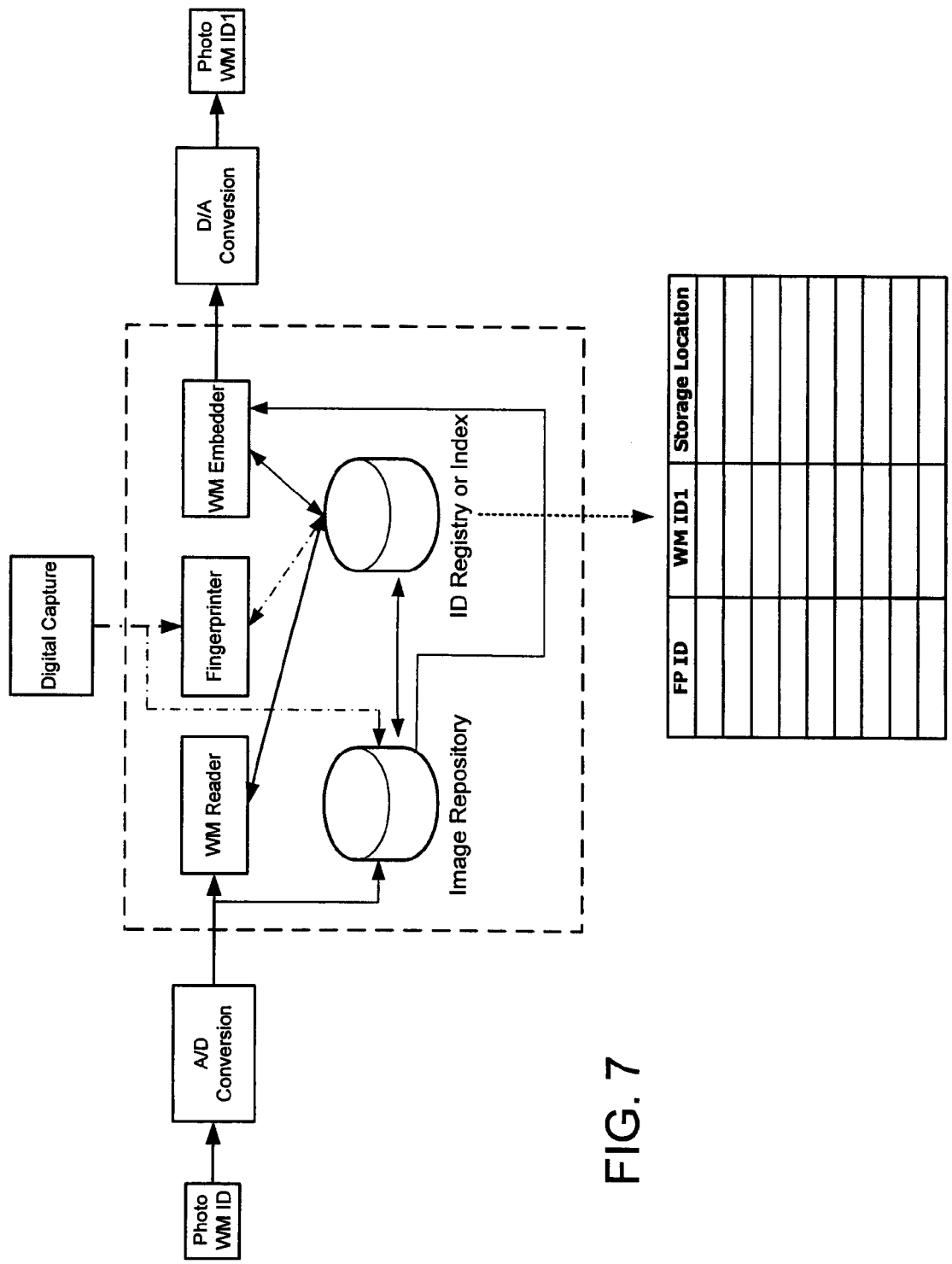
FIG. 7 illustrates another system utilizing both fingerprinting and digital watermarking.

FIG. 7 illustrates a transition from a physical domain to a digital domain. A printed photo is scanned into a digital form. The digital form is analyzed by a digital watermark reader to determine whether the photo is digitally watermarked and, if so, to obtain a watermark identifier (WM ID). The identifier is used to interrogate the registry or index to determine whether the WM ID has been entered into the system before (e.g., WM ID1). If the watermark identifier is present in the registry and if a corresponding image is stored in the image repository, the digital image need not be stored again. (If no watermark is found, the image is handled as discussed above with reference to FIG. 6.) Some of combinations in addition to those discussed above and in the claims include the following. We reserve the right to present these and similar combinations in this or one or more continuing applications.

1. A method comprising:
   printing an image on an image portion of paper, wherein the paper includes an image portion and a tab portion, and wherein the image portion and the tab portion are separated by a boundary;
   printing a reduced fidelity version of the image on the tab portion; and
   printing a steganographic machine-readable code on the tab portion.

2. The method of combination 1 wherein the steganographic machine-readable code is embedded in the reduced fidelity version of the image.

3. The method of combination 1 wherein the boundary comprises a perforated line.

4. The method of combination 3 wherein said tab portion comprises a top side and a bottom side with the reduced fidelity version of the image and the steganographic machine-readable code being printed on the top side.

5. The method of combination 4 wherein the bottom side of the tab portion comprises an adhesive.

6. The method of combination 5, wherein the image portion comprises a top portion and a bottom portion with the image being printed on the top portion, wherein the tab portion is foldable along the perforated line so that the bottom side of the tab portion adheres to the bottom side of the image portion with the adhesive.

7. The method of combination 3 wherein the tab portion is removable from the image portion along the perforated line.

Optical Character Recognition and Digital Watermarks

Digital watermarking can be used to safeguard identification documents. For example, some techniques are detailed in assignee's U.S. Pat. Nos. 5,841,886, 6,389,151 and in assignee's published U.S. Patent Application No. US2005-0160271 A1. Each of these patent documents is hereby incorporated by reference.

By way of background, some document analysis processes include optical character recognition (OCR). One nagging problem with OCR is the variety of printing, languages and font types that occur between different documents and different issuing jurisdictions. For example, Idaho may use a first font when printing driver's licenses, and Oregon may use a second, different font when printing its driver's licenses. Different fonts can confuse or slow down an OCR process. Characters can also be interpreted differently depending on which language is intended. For example, Greek characters may be differently interpreted than English characters. But if an OCR module were to receive hints regarding which type of printing, font or language it was analyzing, the OCR module can apply a correct set of rules (or training set) for interpretation, or reduce processing time by focusing the OCR module on a particular font.

Figure 8:
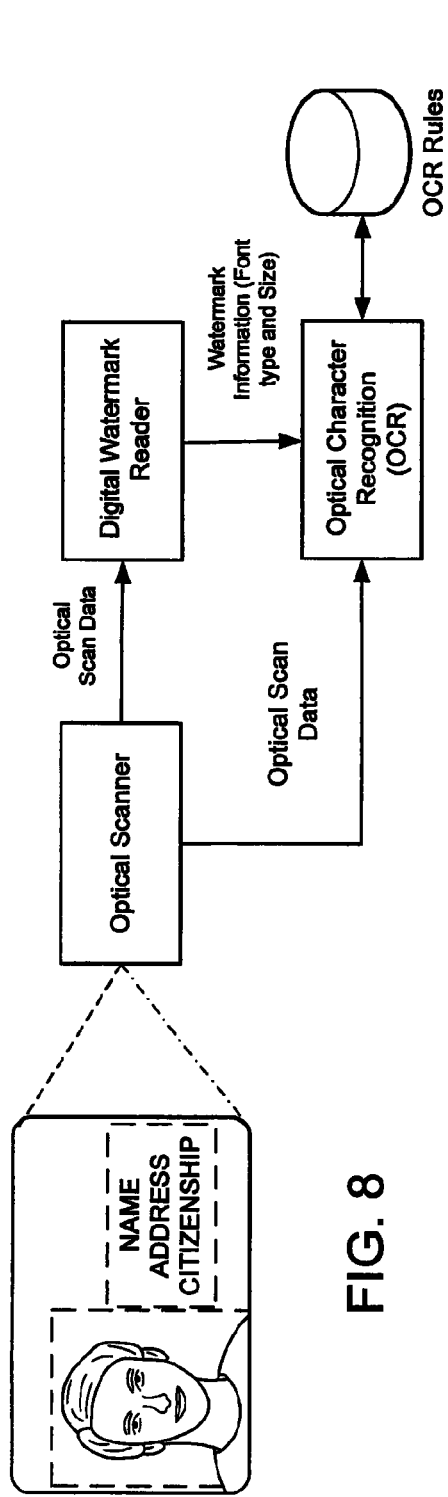
FIG. 8 illustrates optical character recognition enhanced through digital watermarking.

One improvement is to carry (or link to) expected document characteristics in a digital watermark. For example, a digital watermark includes plural-bits that are used to identify or link to a particular font type, font size, printing kind or even an intended language. The watermark bits are used to bias an OCR device in its interpretation of OCR data (see FIG. 8). For example, an OCR module may include or access a first set of recognition rules (or training sets) for Bauhaus 93 font and a second set of recognition rules (or training set) for Arial font. The OCR module applies a different set of recognition rules for different fonts as indicated by the watermark. An OCR module may use watermark information to eliminate all other fonts, sizes and languages expect those indicated by the watermark information. Instead of identifying fonts, different sets of recognition rules may be used for different languages (e.g., Chinese, Spanish, Greek, English, etc.). OCR efficiencies can be achieved by narrowing the field of possible fonts.

Other watermark payload information can be used to infer which type of printing, fonts or languages are expected on the document, instead of using dedicated watermark bits. For example, a watermark may include a state identifier (e.g., "Idaho") and an issued date (e.g., "Jul. 14, 2001"). A database is maintained to show which fonts, printing and languages are expected to be associated with the state identifier on a particular date. This information is provided to an OCR device to bias its interpretation of OCR data. In another example, watermark information may indicate that an underlying document is expected to be Norwegian passport or Italian visa. A data structure is interrogated to determine which font and languages, etc. are expected for these two documents. An OCR module uses this information to help recognize characters in accordance with the expected fonts, sizes, languages, etc.

A digital watermark may include orientation or reference components. The assignee's U.S. Pat. Nos. 6,408,082 and 6,614,914, each hereby incorporated by reference, detail certain reference signals, and processing methods, that permit such watermark decoding even in the presence of image distortion. In some image watermarking embodiments, a reference signal includes a constellation of quasi-impulse functions in the Fourier magnitude domain, each with pseudorandom phase. To detect and quantify the distortion, the watermark decoder converts the watermarked image to the Fourier magnitude domain and then performs a log polar resampling of the Fourier magnitude image. A generalized matched filter correlates a known orientation signal with the re-sampled watermarked signal to find rotation and scale parameters providing the highest correlation. The watermark decoder performs additional correlation operations between the phase information of the known orientation signal and the watermarked signal to determine translation parameters, which identify the origin of the watermark message signal. Having determined the rotation, scale and translation of the watermark signal, a watermark reader adjusts image data to compensate for this distortion.

Figure 9:
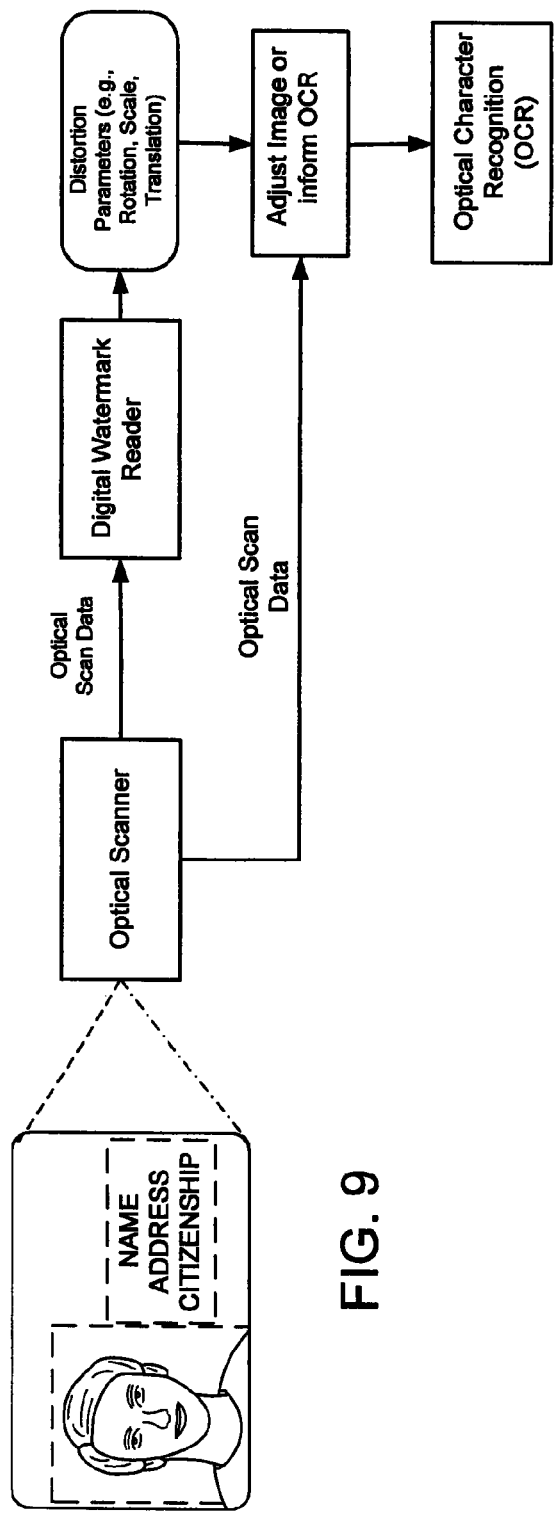
FIG. 9 illustrates image adjustments to improve optical character recognition.

A digital watermark orientation component can be used to determine image distortion from a scanned identification document. Image data is adjusted according to watermark orientation information to compensate for distortion, and then OCR operates on the adjusted image data (see FIG. 9). Compensating for image distortion will help reduce OCR failure caused by image distortion (e.g., scale and rotation of characters).

A watermark translation value can be used to indicate a starting point for OCR analysis. For example, a translation value may yield (or help determine) a spatial location on an identification document. If a watermark and text/numbers/characters are overlaid or otherwise registered, a watermark translation value is used to determine an expected starting point of the text/numbers/characters. Having a starting point (or expected text image location) helps avoid analyzing needless image data.

A watermark scale value can also be helpful to realign image data, particularly when font size is a consideration for an OCR module. (For example, consider a font size of 14, but an image scale of 0.75. The OCR may then think that text is a smaller or different font all together.) The watermark scale value is used to realign image data prior to OCR. In a related implementation, the image data is not realigned, but a scale or other watermark orientation parameter is provided to the OCR module to adjust its character recognition.

A watermark can also include or link to information regarding scanning quality or other properties for a particular document. (E.g., a document is plain text with no background, printed at 150 dpi grayscale (GS). Or another document is an ID Card or Passport with a background printed at 300 dpi, GS or RGB.) A watermark may also carry rules that inform an OCR which fields or zones should be read as letters or as numbers, or if fields/zones are case specific. This information cuts down on, e.g., 0 (zero) vs. O (letter) or G (letter) vs. 6 (number) errors. A watermark may also include specific letter spacing or kerning that is used to distinguish different characters from each other (e.g., ll vs. 11). These properties can be used by an OCR to improve detection.

An expected font, conveyed with a digital watermark, can also be used as an authentication clue. For example, if the OCR is unable to read an expected font, or has a high error rate, an identification document may be considered suspect, e.g., re-originated with a different font, spacing and/or text data.

Another improvement applies a statistical model to optical character recognized data. The statistical model determines whether there is acceptable or expected deviation in the OCR data. The model can be based on testing or training sets over, e.g., a plurality of identification documents. For example, many identification documents are scanned, OCR analyzed, with the analysis being graded. A statistical model for expected OCR-related errors is determined (e.g., 7 errors out of 10,000 characters are expected for a first class of identification documents with an understood standard deviation). Certain types of documents might be recognized as potentially troublesome.

The model once determined is applied to OCR data. The model signals whether there is an out-of-range or high number of OCR errors, relative to the model or test sets. The signal may trigger use of OCR information carried by the digital watermark. Or the signal may trigger additional document inspection. For example, the signal may signal an inspector to manually inspect the document or manually input text from the document.

Instead of applying a model, a digital watermark may carry some or all of the OCR-readable text. The digital watermark information becomes a check on the OCR text. Consider OCR that is used for data entry or form population. An OCR reader reads text and begins populating fields. As part of the process the OCR-reader creates a first hash of some or all of the text. The digital watermark carries a corresponding, second hash derived and embedded during document production. The corresponding, second hash corresponds to the same some or all of the text. The digital watermark is decoded and the second hash is compared to the first hash. A correspondence between the first and second hash provides a quality assurance of the OCR reading.

Some of combinations in addition to those discussed above and in the claims include the following. We reserve the right to present these and similar combinations in this or one or more continuing applications.

A1. A method comprising:
receiving image data corresponding to an identification document;
analyzing the image data to detect digital watermarking embedded therein;
based on information carried by or determined from the digital watermarking, identifying characteristics associated with printing on the identification document; and
providing the characteristics to an optical character recognizer to assist in recognizing the printing.

A2. The method of A1 wherein the characteristics comprise an indication of at least one of font type, font size, language and text spacing.

A3. A method comprising:
receiving image data corresponding to an identification document;
analyzing the image data to detect a digital watermark orientation component embedded therein;
based on orientation information corresponding to the digital watermark orientation component, adjusting the image data; and
applying optical character recognition (OCR) to the adjusted image data to improve image OCR detection.

A4. The method of A3 wherein the orientation information comprises at least one of rotation, scale and translation.

A5. A method comprising:
receiving image data corresponding to an identification document;
analyzing the image data to detect a digital watermark orientation component embedded therein;
determining orientation information corresponding to the digital watermark orientation component; and
adjusting operation of an optical character recognizer in accordance with the orientation information.

A6. The method of A5 wherein the orientation information comprises at least one of rotation, scale and translation.

A7. The method of any one of A1-A6, wherein the identification document comprises at least one of a passport, visa, driver's license, national identification document, green card, birth certificate, travel or trip permit, identification card, financial instrument and check.

A8. A security document comprising
a substrate;
a first graphic carried on or in the substrate, the first graphic representing a photographic image or artwork; and
electronic circuitry carried on or in the substrate, wherein the electronic circuitry comprises information stored therein, the first graphic comprising steganographically encoding including a plural-bit first message that is machine-readable from optical scan data corresponding to at least a portion of said first graphic, wherein the first message comprises at least a code including a biometric representation corresponding to an authorized bearer of the security document, and
wherein the biometric representation once obtained unlocks the electronic circuitry or the information stored therein.

A9. The security document of A8 wherein the document comprises at least one of a banknote, a photo-identification document and a passport.

A10. A method comprising:
receiving image data corresponding to a security document, the security document including a digital watermark and optical recognizable characters;
analyzing the image data to detect a plural-bit message carried by the digital watermark, wherein the plural-bit message includes a reduced-bit representation of the optical recognizable characters;
optically recognizing the characters from scan data and determining a reduced-bit representation of the characters;
comparing the determined reduced-bit representation of the characters to the reduced-bit representation carried by the message; and
determining whether to populate data fields with the optically recognized characters based on the comparing.

A11. The method of A10 wherein the security document comprises at least one of a banknote, a photo-identification document and a passport.

A12. The method of A10 wherein the determined reduced-bit representation of the characters to the reduced-bit representation carried by the message each comprise a hash.

Machine-Readable Codes Unlocking Electronic Circuitry

Assignee's patent application, U.S. patent application Ser. No. 10/686,495 (published as US 2004-0181671 A1), discusses various different security documents such as financial documents (e.g., checks, banknotes, financial instruments, legal instruments, etc.) and identification documents (e.g., driver's licenses, passports, photo identification documents, visa, birth certificates, etc.). Some security documents may include electronic circuitry, as is common with smart card chips or circuitry, RFIDs, etc. One improvement discussed in the Ser. No. 10/686,495 application is a layered security feature (e.g., electronic circuitry) cooperating with digital watermarking or other machine-readable indicia. For example, electronic circuitry may include a code for comparison with (or to unlock or decrypt) a code or message carried by a machine-readable code, or vice versa.

We further explore this improvement herein.

A security document may include many different features, e.g., photograph, text, graphics, artwork, barcodes, magnetic strips, microprinting, overlaminates, cohesively failing inks, optical varying devices such as, e.g., holograms or Kinograms, OCR-B text (available in some passports), and electronic circuitry. Of course this list is not exhaustive. Some or all of these features may be arranged variously on a front or back side of the security document.

Figure 10:
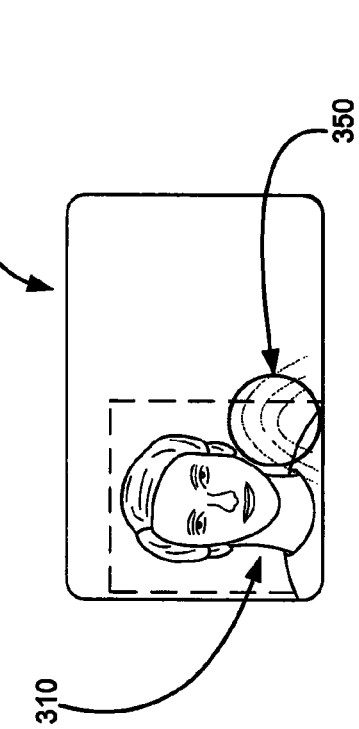
FIG. 10 illustrates a security document including electronic circuitry.

To simplify the discussion, and with reference to FIG. 10, we illustrate but a few of the many possible security document features. (Of course, our inventive techniques will benefit documents including more or less features as well.).

Security document 100 includes a photographic representation 110, optically recognizable characters (e.g., OCR-B text) 120 and electronic circuitry 130.

Photographic representation 110 includes steganographic indicia embedded therein. One from of steganography is digital watermarking. Of course, other forms of steganography which alter a host signal (e.g., photograph 110) to hide or conceal information therein can be employed. The steganographic indicia includes a plural-bit identifier or message.

Electronic circuitry 130 often takes a form of a contactless chip (the reader will notice that we sometimes use the terms "electronic circuitry" and "chip" interchangeable herein). These contactless chips cooperate with an antenna to allow radio frequency communication with the chip. Suitable chips include, e.g., those falling within the ISO 14443 and 15693 chips specifications. Of course, our inventive methods and systems apply to other known contact and contactless chips as well.

Some chips allow information stored thereon to be "locked." The information is accessible only after a key, personal identification number (PIN), a password, or a biometric factor (such as a fingerprint) is provided.

The steganographically hidden identifier or message may include a key, which when communicated to the electronic circuitry 130 unlocks the circuitry or information stored therein.

The key can take a variety of forms.

In one implementation the key includes a user-selected PIN, access code or password. The user selects the PIN, code or password as part of security document enrolment or activation. The PIN, code or password—once decoded from the steganographic indicia—is communicated to the chip to unlock the circuitry or access to the information stored therein.

In another implementation the key comprises a hash or reduced-bit representation of information stored on the chip. The hash is compared against the information (or a hash derived from the information) stored on the chip. Access is granted when the hash coincides as expected.

The key can also include information about the information or storage protocol used by the chip. For example, the key will indicate which protocol a reader should employ to read the information from the chip. Or, the protocol information must be provided to the chip and sensing a match allows access to the information.

In still other implementations the key includes decryption information that is used to decrypt the information on the chip. For example, the decryption information may include a decryption key or a seed to a pseudo-random generator that is used to generate a decryption key. The decryption information may also identify a particular type of encryption or encryption algorithm that was used to encrypt the information.

Of course, the key may also include or reference biometric information that is used to unlock the chip or access the information stored therein. The biometric information may take different forms, e.g., fingerprint, facial template, iris or retina representation, etc. Once decoded from the steganographic indicia, the biometric information is provided to the chip to facilitate access to the information stored therein.

While we have described the steganographic indicia being hidden in the photographic representation 110, we note that steganographic indicia can be hidden in other document areas as well. For example, the document may include artwork, text, graphics, seals, holograms, etc. And steganographic indicia may be hidden in these features.

While a key may be carried in a barcode or other machine-readable indicia, we note that added security is provided to a document when the key is hidden or concealed through steganography. A visible barcode provides a would-be counterfeiter with a visible target.

Documents with Thermo-Responsive Properties

There are known inks and materials that include thermo-responsive properties. For example, some thermochromatic inks become visible when they are heated or cooled. Some plastics and other materials similarly respond when heated or cooled.

One improvement utilizes such thermo-responsive materials.

Figure 11A:
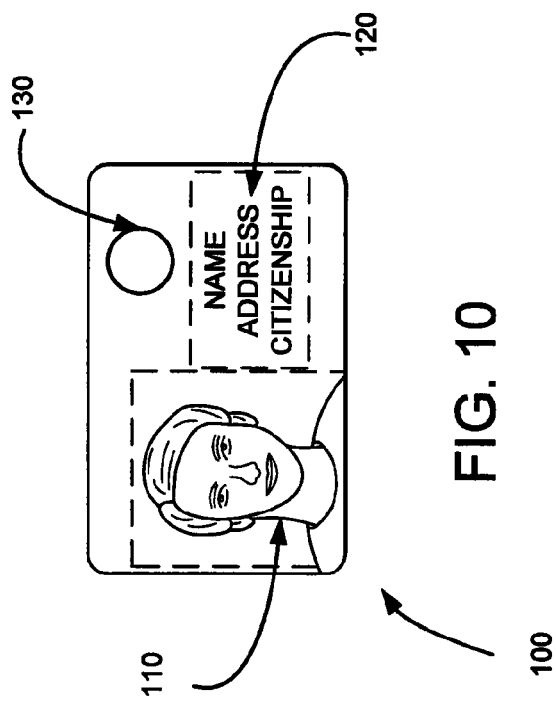
FIGS. 11A and 11B illustrates a security document including at least one thermo-responsive area.

With reference to FIG. 11A, we provide an identification document 300 including at least photograph 310. (While not illustrated as such, document 300 will typically include additional features as well.).

The photograph 310 region includes at least some areas that have thermo-responsive properties. For example, the properties may include a thermo-chromatic ink. Such inks are usually inactive or generally imperceptible until heated or cooled. The ink activates in response to heat or cold. The ink may fluoresce, e.g., in the visible spectrum, when heated.

In a first implementation, the photograph 310 or other document area includes a first digital watermark or other steganographic indicia. The first digital watermark includes a plural-bit payload or message. In this first implementation the message or payload includes a biometric template or hash that correspond to an authorized user's thumb or fingerprint template or hash. The digital watermark can be redundantly embedded in the photograph 310.

Figure 11B:
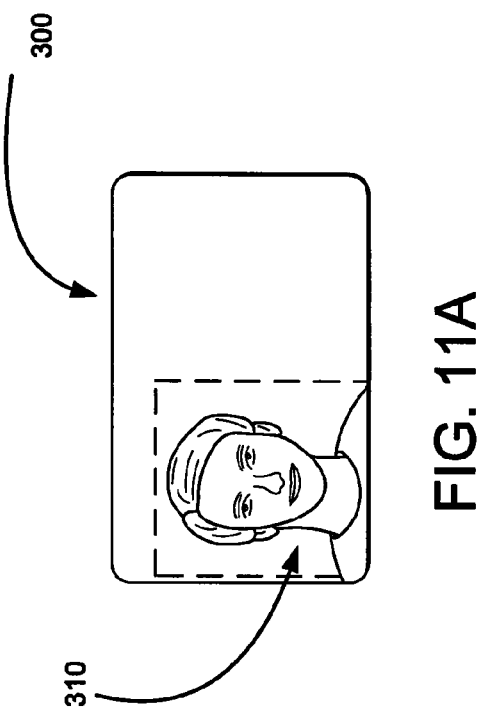

The user applies her thumb or finger to the photograph 310, which heats up the thermo-responsive materials in a pattern corresponding to her thumb or finger. The thermo-responsive material (e.g., ink) fluoresces in a pattern corresponding to the user's fingerprint while heated (350 shown in FIG. 11B).

An optical scan captures the fingerprint 350 and the photograph 310. Fingerprint recognition software and/or hardware creates a corresponding template or hash (e.g., based on minutia points and/or locations).

A digital watermark detector analyzes the optical scan data to recover the digital watermark message. The template or hash is recovered from the watermark and is then compared to the fingerprint template or hash.

An indication of document authentication is provided based on the result.

(This process pre-supposes that the authorized user presents a fingerprint for sampling during document creation. The presented fingerprint is analyzed by corresponding fingerprint recognition software and/or hardware to create a fingerprint template or hash. This fingerprint information is used to create the information stored or carried by the digital watermark. The user may also have a choice of which fingerprint they want to use, further providing a layer of security. That is, the user is the only person who knows which finger is represented in the digital watermark. Also, an area corresponding to region 350 can be located elsewhere, besides an area overlapping with photograph 310, on security document 300.)

In other implementations the fingerprint does not corresponding to the digital watermark. The digital watermark may carry completely different or unrelated information. This allows for inspector verification. For example, a fingerprint may correspond to an inspector (e.g., at a liquor store or by a police officer). The inspector imprints (or actives thermo-responsive materials) their fingerprint on the identification document 300 and then takes an optical scan. The optical scan captures at least a portion of the document including the digital watermark and their fluorescing or otherwise visible fingerprint. This scan serves as evidence that the identification document was inspected by a particular inspector. The optical scan can be archived as an evidence receipt.

In another implementation, a digital watermark is provided on the identification document with thermo-chromatic ink. The digital watermark is otherwise unobservable absent heat applied to the area. Still, even when the ink is activated, the digital watermark can be imperceptible. This can be accomplished through employing, e.g., a subtle tint or background pattern or color matching to convey the digital watermark. The card holder activates an area including the digital watermark by, e.g., pressing their thumb against the area. Instead of showing their thumb, the heated area reveal a graphic, image or subtle background or tint including the digital watermark. The now-perceptible digital watermark is captured through optical scanning. In summary, this watermark is heat sensitive, becoming detectable only after it is activated.

Some of the many possible combinations of the teachings, above, include the following combinations. We reserve the right to present these and other combinations as claims in this or one or more continuing applications.

B1. A security document comprising:
a photograph including a digital watermark hidden therein, said digital watermark comprising a template or hash corresponding to a fingerprint; and
a thermo-responsive area, wherein application of a finger to the thermo-responsive area produces a visually perceptible pattern reflecting a fingerprint of the finger.

B2. The security document of B1 wherein the thermo-responsive material comprises thermochromatic ink.

B3. A method comprising:
optically capturing imagery of a security document, the imagery including:
a digital watermark hidden in the imagery; and
a fingerprint provided on the document through application of a finger to an area including thermo-responsive material, wherein the fingerprint is only perceptible for optical capture for a limited amount of time; and
storing the optically captured imagery as a record of inspection.

B4. The method of B3 wherein the fingerprint corresponds to an inspector.

B5. The method of B3 wherein the thermo-responsive material comprises a thermo-chromatic ink.

Authentication with Cell Phones

Some images are screen coded for protection. Think of scrambled indicia where an image is only revealed when a red overlay is placed over the image. Some of us may even remember so-called "decoder rings." These rings operate on the same principle. The overlay provides interference (or a "matched screen") to emphasize or deemphasize various features (lines, color, etc.), allowing a desired image to become more perceptible.

We propose to automate this process through use of cell phones.

Most of today's cell phones include digital cameras or other optical sensors. They even include a display for a user to view captured imagery.

Such a cell phone is augmented with a plurality of digital matched screens (or interference filters). These filters can range from the simple, e.g., line structure or line grid, to the complex, e.g., pseudo-random patterns.

Scrambled indicia is optically sensed with a cell phone. Say, for example, that the scrambled indicia is carried on a passport. The scrambled indicia in this example obscures the word "Passport" therein.

The cell phone (perhaps after user selection) digitally applies one matched screen after another to the optical scan data representing the scramble indicia.

The user can see this process on the screen. When a corresponding digital matched screen is applied to the scrambled indicia, the word "Passport" is recognizable on the cell phone display. The user then has some enhanced respect for the authenticity of the passport. (In the digital world, the screen image can be added to the scrambled indicia. In other implementations, the screen includes instructions of which colors or image areas to mute or enhance.)

The user can select from a pull-down menu a type of document or article that she is inspecting. For example, the pull down menu may include passport, currency, driver's license (and even a particular state), car title, certificate, etc. The cell phone first applies one or more matched screens that are associated with the selected item from the pull down menu. The cell phone may even know that scrambled indicia associated with a passport is expected to include, e.g., the word "Passport". After applying an expected matched screen, the cell phone can execute OCR or pattern matching to determine whether the term "Passport" is present. If so, the cell phone can give a visual or audio authentication indicator, display the term and/or even highlight the term on the user display.

Proper orientation of a matched screen relative to captured indicia may come into play. We note in this regard that a digital watermark may include an orientation component as discussed above. The scrambled indicia may include an orientation component that once decoded is used to properly align the image data for rotation, scale and translation. One or more matched screens are applied to the image data after orientation.

(It will be appreciated that today's cell phone include sophisticated computing capabilities. Many include processors at 400 MHz and higher with dedicated DSP circuitry. The matched screens can be stored in memory and applied through software operating by the processor. Or the functionality can be carried through dedicated circuits as well.).

Some of the many possible combinations of the teachings, above, include the following combinations. We reserve the right to present these and other combinations as claims in this or one or more continuing applications.

C1 A cell phone comprising:
an optical sensor;
a display to display imagery captured by the optical sensor;
electronic circuitry, and
memory including a plurality of matched screens, the matched screens corresponding to a plurality of different scrambled indicia, wherein application of a matched screen to a corresponding scrambled indicia reveals an image or graphic obscured therein, wherein
the electronic circuitry executes instructions to apply at least some of the plurality of matched screens to captured indicia and display same via the display.

C2. A method of authenticating a security document including scrambled indicia comprising:
optically capturing imagery of the scrambled indicia;
applying a plurality of a digital filters or screens to the scrambled indicia, wherein at least one of the plurality of digital filters or screens comprises a screen or filter that is matched to the scrambled indicia, wherein said applying a matched screen or filter helps to reveal a feature or graphic that is otherwise obscured in the scrambled indicia;
displaying results of said applying on a cell phone display.

C3. The method of C2 wherein the security document comprises at least one of a banknote, a photo-identification document and a passport.

Having described and illustrated the principles of our invention with reference to a specific media type (e.g., images), it will be recognized that the principles thereof can be implemented in other, different, media types. For example, the same principles are equally applicable to video and audio. And the terms "image" and "imagery" are used broadly enough herein to encompass video as well.

As another example, an all-in-printer can, upon sensing images stored on a memory card or via Bluetooth, automatically upload the images to an image repository. The image repository can be on a local network (e.g., computer) or on-line. The user can also be prompted whether she wants to add these images to the image repository prior to their uploading. If the user does not choose to upload, and would rather leave the images on her memory card, an image database index can be updated to include the last known location of the images, i.e., on the memory card.

While some embodiments of the present invention have been described as using an "all-in-one" printer, the present invention is not so limited. Indeed, our inventive methods and systems can employee many other types of optical scanners and printers as well.

Use of section headings is not intended to provide any limitations. Indeed, subject matter under one section heading can be combined with subject matter found under other section headings.

We also envision that the PC functionality described with respect to FIGS. 3-5 can be moved to a printer, digital music player and/or cell phone. Thus, placement of control modules, digital watermarking, image searching tools, image storage, etc. shown as hosted by a PC is not intended to be limiting.

While the foregoing description has made reference to transmitting or communicating a watermark, in many implementations only a part of the watermark is transmitted. (For example, the watermark may include error correcting information, or other data or payload information that is not used to identify the corresponding imagery or audio.)

To provide a comprehensive disclosure without unduly lengthening this specification, applicants incorporate by reference the patents and applications cited above.

In view of the wide variety of embodiments to which the principles of our invention can be applied, it should be recognized that the detailed embodiments are illustrative only and should not be taken as limiting the scope of the invention. Rather, we claim as our invention all such embodiments as may come within the scope and spirit of the following claims, and equivalents thereto.

We claim:

1. A method comprising:
receiving digital imagery or audio, wherein the digital imagery or audio comprises digital watermarking including a first instruction, wherein the digital watermarking is hidden in the digital imagery or audio through alterations of data representing the digital imagery or audio;
using at least a programmed electronic processor, decoding the digital watermarking from the digital imagery or audio to obtain a first instruction carried by or linked to the digital watermarking;
communicating the first instruction to a remotely located online site, the online site including an address associated with the digital imagery or audio, the first instruction instructs the online site to provide a future update to inform a user device when the address associated with the digital imagery or audio changes; and
based at least in part on receiving the future update, updating the user device with information contained in the future update when an address associated with the digital imagery or audio changes.

2. The method of claim 1, wherein the user device comprises a desktop searching tool.

3. The method of claim 1 wherein the digital watermarking includes a user identifier or user device identifier.

4. A non-transitory computer readable memory comprising instructions stored therein, said instructions causing an electronic processor to perform the method of claim 1.

5. A programmed computing device comprising instructions stored in memory, said instructions causing said programmed computing device to perform the method of claim 1.

6. The method of claim 1 in which a fingerprint derived from data representing the digital imagery or audio is associated in a data repository with the digital imagery or audio.

7. A non-transitory computer readable memory comprising instructions stored therein, said instructions are for causing an electronic processor to perform the method of claim 6.

8. An electronic apparatus programmed to perform the method of claim 6.

9. An electronic apparatus programmed to perform the method of claim 1.

10. The method of claim 1 in which said user device comprises a cell phone.

11. An apparatus comprising:
electronic memory for storing received digital imagery or audio, in which the digital imagery or audio comprises digital watermarking including a first instruction, in which the digital watermarking is hidden in the digital imagery or audio through alterations of data representing the digital imagery or through alterations of data representing the audio; and an electronic processor programmed for:
  decoding the digital watermark from the digital imagery or audio to obtain a first instruction;
  communicating the first instruction to a remotely located online site, the online site including an address associated with the digital imagery or audio, the first instruction instructs the online site to provide a future update to inform a user device when the address associated with the digital imagery or audio changes; and
  based at least in part on receiving the future update, updating said apparatus with information contained in the future update when the address associated with the digital imagery or audio changes.

12. The apparatus of claim 11 in which said apparatus comprises a desktop searching tool.

13. The apparatus of claim 11 in which the digital watermarking further includes a user identifier or user device identifier.

14. The apparatus of claim 11 in which a fingerprint derived from data representing the digital imagery or audio is associated in a data repository with the digital imagery or audio.

15. The apparatus of claim 11 in which said electronic processor is operating to perform at least one function recited therein.

16. A cell phone comprising the apparatus of claim 11.

* * * * *